US012768401B2

(12) United States Patent
Ando et al.

(10) Patent No.: US 12,768,401 B2
(45) Date of Patent: Oct. 20, 2026

(54) SLIDING MEMBER

(71) Applicant: DAIDO METAL COMPANY LTD., Nagoya (JP)

(72) Inventors: Akira Ando, Inuyama (JP); Tomoyasu Shiroya, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 164 days.

(21) Appl. No.: 18/639,897

(22) Filed: Apr. 18, 2024

(65) Prior Publication Data

US 2024/0352970 A1 Oct. 24, 2024

(30) Foreign Application Priority Data

Apr. 21, 2023 (JP) ................................ 2023-069931

(51) Int. Cl.
*F16C 33/12* (2006.01)
*F16C 17/02* (2006.01)
*F16C 33/04* (2006.01)

(52) U.S. Cl.
CPC .......... *F16C 33/127* (2013.01); *F16C 17/022* (2013.01); *F16C 33/046* (2013.01); *F16C 33/122* (2013.01); *F16C 2204/20* (2013.01); *F16C 2226/40* (2013.01)

(58) Field of Classification Search
None
See application file for complete search history.

(56) References Cited

U.S. PATENT DOCUMENTS 2,741,016 A * 4/1956 Roach .................. B32B 15/017 428/673
2020/0309221 A1 10/2020 Kamei

FOREIGN PATENT DOCUMENTS

| | | | |
|---|---|---|---|
| GB | 750557 | A | 6/1956 |
| JP | 2006-266445 | A | 10/2006 |
| JP | 2013-245767 | A | 12/2013 |
| JP | 2020-132924 | A | 8/2020 |

OTHER PUBLICATIONS

Extended European Search Report dated Sep. 23, 2024 in European Application No. 24170503.7.

* cited by examiner

*Primary Examiner* — Daniel J. Schleis
(74) *Attorney, Agent, or Firm* — Harness, Dickey & Pierce, P.L.C.

(57) ABSTRACT

A sliding member includes: a semi-annular metal member having a back metal layer arranged on an outer circumferential surface side and a lining layer made of an Al alloy and arranged on an inner circumferential surface side; an adhesive layer stacked on an inner circumferential surface of the metal member and containing Zn as a main component; an intermediate layer stacked on the adhesive layer and containing Ag, Ni, or Co as a main component; and a cover layer stacked on the intermediate layer and containing Bi, Pb, or Sn as a main component. The adhesive layer extends continuously so as to further cover an axial end face of the metal member, and the ratio of a surface area of the adhesive layer covering the axial end face to a surface area of the axial end face is 30% or more.

8 Claims, 8 Drawing Sheets

SLIDING MEMBER

BACKGROUND OF THE INVENTION

(1) Field of the Invention

The present invention relates to a sliding member in an internal combustion engine, and more particularly to a sliding member in which a cover layer is stacked on a base material via an intermediate layer.

(2) Description of Related Art

As a sliding member in an internal combustion engine, a slide bearing such as a half bearing or a half thrust bearing used in a crankshaft or a connecting rod of an automobile internal combustion engine is known, for example. Conventionally, for a half thrust bearing, a metal member which is formed by lining a surface of a steel back metal with a bearing alloy (base material) made of an Al alloy and then made in a semi-annular shape so that the bearing alloy is located on an inner circumferential surface side is used while a surface of the bearing alloy is covered with a cover layer via an intermediate layer by electroplating or the like. The cover layer is employed to improve conformability or the like with a counterpart material, and the intermediate layer is employed to improve adhesiveness between the bearing alloy and the cover layer.

However, in a sliding member, there has been the problem that when a surface of a bearing alloy made of an Al alloy is covered with a cover layer via an intermediate layer including Ag as a main component, peeling occurs between the bearing alloy and the intermediate layer. In JP 2020-132924 A, in order to address this problem, a first intermediate layer including Cu as a main component is provided on a bearing alloy (lining), and a second intermediate layer including Ag as a main component is further provided on the first intermediate layer, thereby reducing the possibility of peeling between the lining and the second intermediate layer, and reducing the possibility that Cu diffuses from the first intermediate layer to the cover layer to reduce fatigue resistance.

Further, in order to improve adhesiveness of a cover layer to a bearing alloy made of a Cu alloy or an Al alloy in a sliding member, JP 2006-266445 A proposes controlling crystal grains of an intermediate layer so as to be larger from a bearing alloy side toward a cover layer side, and forming the intermediate layer out of a single metal of Ag, Cu, or Co. In order to improve fatigue resistance, JP 2006-266445 A also proposes controlling the growth of crystal grains of the cover layer so as to be long columnar crystals in a thickness direction of the cover layer.

While a sliding member using an Al alloy for a bearing alloy has been often employed in recent years, because recent automobile internal combustion engines become further high-powered, and higher fatigue resistance is required for the sliding member, currently proposed intermediate layers are insufficient in adhesiveness. Meanwhile, subjecting an Al material to Zn treatment to improve adhesive force becomes predominant, and the Zn treatment is used also for surface processing of the Al material used for weight saving of automobiles and semiconductor processing. However, because a high load is applied to the sliding member, the Zn treatment has not been able to ensure sufficient adhesive force for necessary performance.

BRIEF SUMMARY OF THE INVENTION

Therefore, an object of the present invention is to improve adhesiveness of an intermediate layer and a cover layer to a metal member in a sliding member in which an adhesive layer including Zn as a main component is provided on the metal member having a lining layer made of an Al alloy.

FIG. 1 illustrates a part of a section of a conventional annular sliding member 101 along a plane including an axis. As understood, the sliding member 101 includes a metal member 110 containing a steel back metal layer 111 and a lining layer 112 made of an Al alloy, an adhesive layer 120 including Zn as a main component and covering a surface of the lining layer 112, an intermediate layer 130 stacked on the adhesive layer, and a cover layer 140 stacked on the intermediate layer. The inventors have found out that in the conventional sliding member 101, when a sliding surface 140*a* is subjected to a high load, peeling occurs at a point A on an axial end face where the adhesive layer 120 terminates with respect to the metal member 110, and sufficient adhesive force is not obtained.

Therefore, in order to achieve the above object, according to a first aspect of the present invention, there is provided a sliding member including:

- a semi-annular metal member having a back metal layer arranged on an outer circumferential surface side and a lining layer made of an Al alloy and arranged on an inner circumferential surface side;
- an adhesive layer stacked on an inner circumferential surface of the metal member and including Zn as a main component;
- an intermediate layer stacked on the adhesive layer and including Ag, Ni, or Co as a main component; and
- a cover layer stacked on the intermediate layer and including Bi, Pb, or Sn as a main component, wherein
- the adhesive layer on the inner circumferential surface of the metal member extends continuously so as to further cover an axial end face of the metal member, and the ratio of a surface area of the adhesive layer covering the axial end face to a surface area of the axial end face is 30% or more.

This sliding member may be used as a half bearing, for example.

It is preferable to use an Fe-base metal or alloy for a back metal, but without being limited to the Fe-base, a metal or alloy of a Cu-base, Al-base, Ti-base, or the like may be used according to a purpose of use. When an Fe-base metal or alloy is used for a back metal, a current density for plating treatment is preferably set to be high on a rear surface side.

A Cu-plated layer or the like may be provided between a back metal layer and a lining layer of a metal member.

The adhesive layer is preferably formed at least below the intermediate layer on the inner circumferential surface of the metal member, and does not necessarily need to cover the entire inner circumferential surface of the metal member. For example, a bore, a groove, or the like may be provided on the inner circumferential surface of the metal member. Further, the adhesive layer may extend so as to cover at least one axial end face of the metal member, but also may extend so as to cover both axial end faces.

According to one embodiment of the present invention, the ratio of the surface area of the adhesive layer covering the axial end face to the surface area of the axial end face of the metal member may be 70% or more.

According to another embodiment of the present invention, the adhesive layer covering the axial end face may extend continuously so as to further cover the outer circumferential surface of the metal member, wherein the ratio of a surface area of the adhesive layer covering the outer circumferential surface of the metal member to a surface area of the outer circumferential surface may be 30% or more.

According to still another embodiment of the present invention, the intermediate layer and the cover layer may be stacked also on the adhesive layer covering the axial end face of the metal member, and the ratio of surface areas of the intermediate layer and the cover layer stacked on the adhesive layer covering the axial end face of the metal member to a surface area of the axial end face may be 30% or more.

According to still another embodiment of the present invention, the ratio of the surface areas of the intermediate layer and the cover layer stacked on the adhesive layer covering the axial end face of the metal member to the surface area of the axial end face may be 70% or more.

According to still another embodiment of the present invention, the intermediate layer and the cover layer may be stacked also on the adhesive layer covering the outer circumferential surface of the metal member, and the ratio of surface areas of the intermediate layer and the cover layer stacked on the adhesive layer covering the outer circumferential surface of the metal member to the surface area of the outer circumferential surface may be 30% or more.

According to still another embodiment of the present invention, the sum of thicknesses of the intermediate layer and the cover layer stacked on the adhesive layer covering the axial end face of the metal member may be equal to or less than the sum of thicknesses of the intermediate layer and the cover layer stacked on the adhesive layer covering the inner circumferential surface of the metal member.

Further, according to a second aspect of the present invention, there is provided a sliding member including:

a semi-annular metal member having a back metal layer arranged on a first axial end face side and a lining layer made of an Al alloy and arranged on a second axial end face side;

an adhesive layer stacked on a second axial end face of the metal member and including Zn as a main component;

an intermediate layer stacked on the adhesive layer and including Ag, Ni, or Co as a main component; and a cover layer stacked on the intermediate layer and including Bi, Pb, or Sn as a main component, wherein the adhesive layer on the second axial end face of the metal member extends continuously so as to further cover an inner circumferential surface and an outer circumferential surface of the metal member, and the ratio of a surface area of the adhesive layer covering the inner circumferential surface and the outer circumferential surface to surface areas of the inner circumferential surface and the outer circumferential surface is 30% or more.

This sliding member may be used as a half thrust bearing, for example.

According to the present invention, the adhesive layer extending in a wide range of the metal member, i.e. up to a region which is not subjected to a high load is formed by conducting a Zn treatment not only for the inner circumferential surface of the metal member but also for the axial end face thereof. Consequently, an end portion (terminating point) of the adhesive layer does not exist below the intermediate layer subjected to a load, and therefore a point of low adhesion which may become a starting point of peeling is not made. Particularly, when a surface area of the adhesive layer formed on the axial end face of the metal member exists 70% or more relative to a surface area of the axial end face, a sufficient capability can be obtained in terms of adhesion.

Note that, in the axial end face of the metal member, the cover layer and the intermediate layer hardly adhere if there is not the adhesive layer, and therefore it is possible to determine that, if the cover layer and the intermediate layer cover the axial end face, the adhesive layer also exists below these layers.

Further, there is the possibility of occurrence of peeling around a boundary, in the axial end face of the metal member, between the lining layer and the back metal layer where the kinds of metals change, as a starting point of peeling other than the region below the sliding surface subjected to a load. Since a thickness (radial length) of the lining layer relative to a thickness (radial length) of the axial end face is about 20%, if surface areas of the intermediate layer and the cover layer formed on the axial end face exist 30% or more relative to a surface area of the axial end face, it can be recognized that the adhesive layer is formed to extend up to the axial end face of the back metal layer.

Thicknesses (axial lengths) of the cover layer and the intermediate layer stacked on the axial end face do not have a direct impact on bearing properties, but are preferably smaller than thicknesses (radial lengths) of the cover layer and the intermediate layer on the inner circumferential surface so as to enable suitable assembling to a bearing housing.

Other objects, features, and advantages of the present invention will be more apparent from the description of the following examples of the present invention relating to the accompanying drawings.

DESCRIPTION OF THE EMBODIMENTS

Hereinafter, examples of the present invention will be described with reference to the accompanying drawings.

(Structure of Sliding Member)

Figure 1:
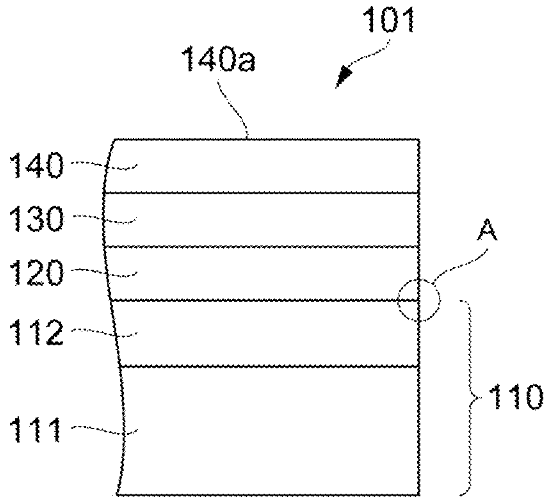
FIG. 1 is a view illustrating a part of a section of a conventional annular sliding member 101 along a plane including an axis.
Figure 2:
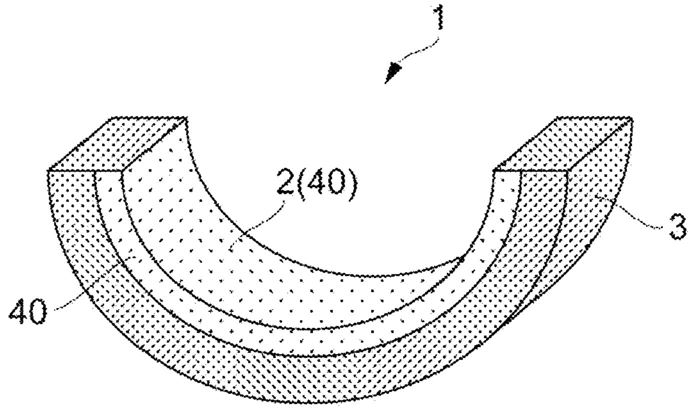
PRIOR ART FIG. 2
FIG. 2 is a perspective view of a sliding member 1 according to an example of the present invention.
Figure 3:
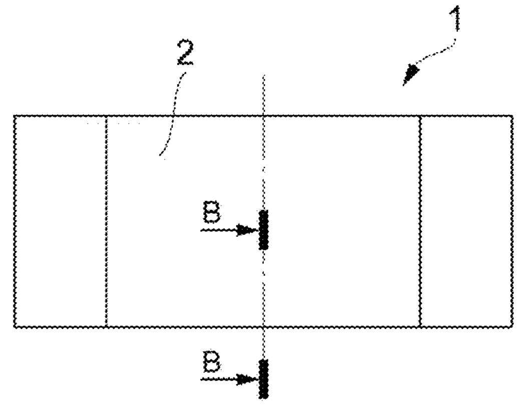
FIG. 3 is a plan view of the sliding member 1.

FIG. 2 is a perspective view of a sliding member 1 according to the present example. FIG. 3 is a plan view of the sliding member 1. As understood, the sliding member 1 has a semi-annular shape, and defines a sliding surface 2 on an inner circumferential surface side, and a rear surface 3 on an outer circumferential surface side.

Figure 4:
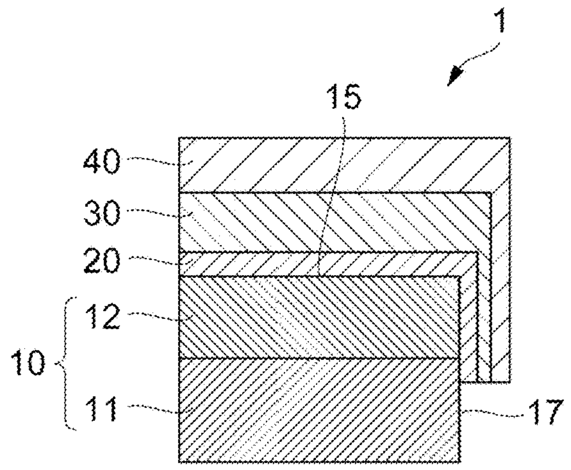
FIG. 4 is a schematic view illustrating a sectional view along the line B-B of FIG. 3 in an exaggerated manner.
Figure 5:
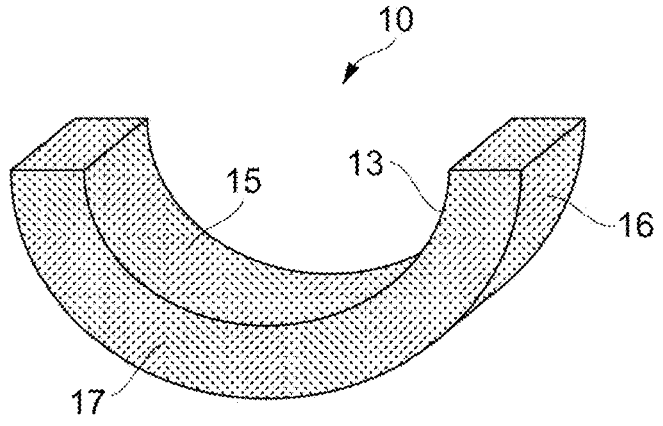
FIG. 5 is a perspective view of a metal member 10.

FIG. 4 is a schematic view illustrating a sectional view along the line B-B of FIG. 3 in an exaggerated manner. FIG. 5 is a perspective view of a metal member 10. The sliding member 1 includes the metal member 10 formed into a semi-annular shape. The metal member 10 defines an inner circumferential surface 15, an outer circumferential surface 16, and an axial end face 17. The metal member 10 has a stack structure including a back metal layer 11 made of an Fe alloy on an outer circumferential side, and a lining layer 12 made of an Al alloy on an inner circumferential side.

Figure 6:
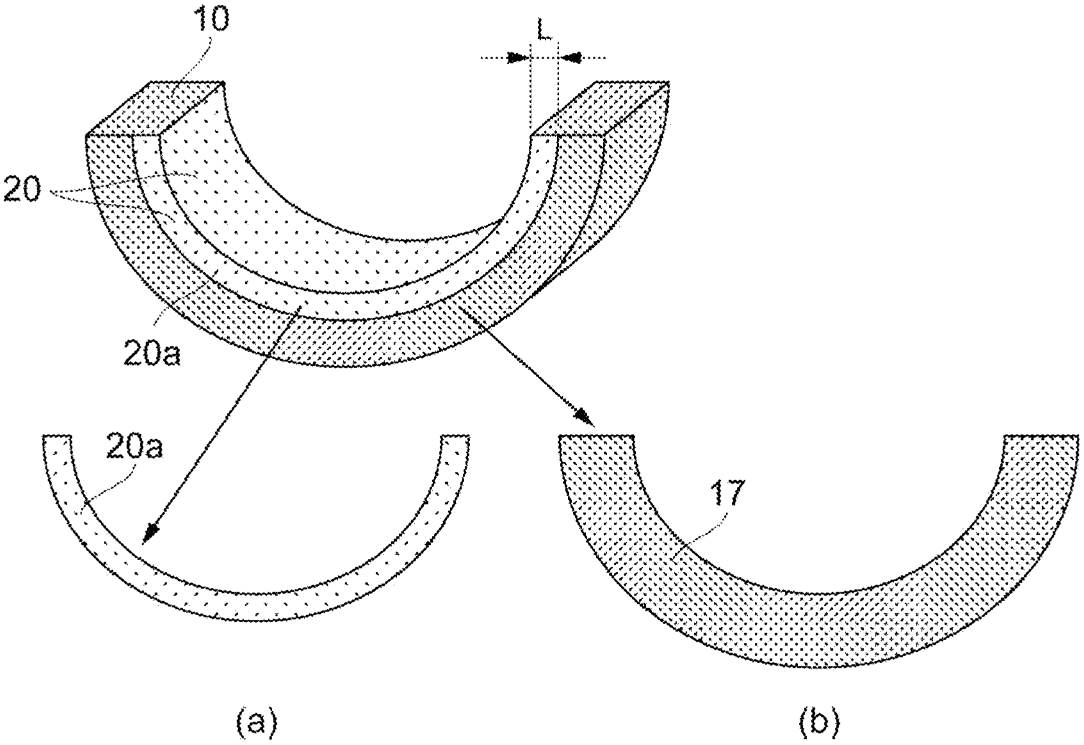
FIG. 6 is a view illustrating the metal member 10 on which only an adhesive layer 20 is stacked.

As illustrated in FIG. 4, an adhesive layer 20 including Zn as a main component is stacked so as to cover a top face of the inner circumferential surface 15 of the metal member 10. The adhesive layer 20 further extends continuously from the inner circumferential surface 15 side of the metal member 10 to the axial end face 17 side (i.e., so as to cover an inner diameter side region of the axial end face 17) and thereby covers at least 30% of a surface area of the axial end face 17. In order to ease understanding, the metal member 10 which is plated only with the adhesive layer 20 is illustrated in FIG. 6. Particularly, FIG. 6(*b*) is a view in which the axial end face 17 of the metal member 10 is cut out, and FIG. 6(*a*) is a view of a portion 20*a* of the adhesive layer 20 formed on the axial end face 17. Therefore, in the present example, the ratio of an area of the adhesive layer 20*a* illustrated in FIG. 6(*a*) to an area of the axial end face 17 illustrated in FIG. 6(*b*) is 30% or more.

Note that, the adhesive layer 20 extends by a certain radial length L from an inner diameter side end portion 13 over the circumferential direction of the axial end face 17 to cover the inner diameter side region of the axial end face 17 in the present example, but according to the present invention, as long as the adhesive layer 20 covers at least 30% of a surface area of the axial end face 17, the length L does not necessarily need to be constant over the circumferential direction.

Furthermore, as illustrated in FIG. 4, an intermediate layer 30 including Ag, Ni, or Co as a main component is formed on the adhesive layer 20. Therefore, in the present example, the intermediate layer 30 extends by the certain radial length L from the inner diameter side end portion 13 on the axial end face 17 of the metal member 10.

A cover layer 40 including Bi, Pb, or Sn as a main component is formed on the intermediate layer 30 as well. Therefore, in the present example, the cover layer 40 also extends by the certain radial length L from the inner diameter side end portion 13 on the axial end face 17 of the metal member 10.

Note that, in the present example, the intermediate layer 30 and the cover layer 40 extend by the certain radial length L from the inner diameter-side end portion 13 on the axial end face 17 of the metal member 10, but do not necessarily need to be similar to the adhesive layer 20, and may be longer or shorter than the certain radial length L of the adhesive layer 20.

(Manufacturing Method of Sliding Member)

First, a top face of a steel plate constituting the back metal layer 11 is lined with a bearing alloy (lining layer 12) to produce a bimetal. Then, this bimetal is worked into a semi-annular shape to obtain the metal member 10.

Then, the lining layer 12 of the metal member 10 is coated with an overlay in accordance with the following procedure. Note that, the following plating treatment conditions are an example in the case where the thickness of a cover layer is 2 to 10 μm, the thickness of an intermediate layer is 2 to 10 μm, and the thickness of an adhesive layer 0.7 μm or less.

(1) Adhesive Layer (Zn)

Figure 7:
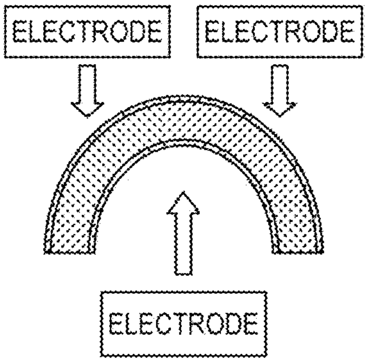
FIG. 7 is a view illustrating an overview of Zn treatment.

As a Zn solution, zinc oxide of 40 to 80 g/L, caustic soda of 400 to 500 g/L, Rochelle salt of 25 to 30 g/L, and iron chloride of 2 to 9 g/L are used. Current density is set at 0.1 to 2 $A/dm^2$ on an inner surface side, and 0.1 to 2 $A/dm^2$ on a rear surface side. In other words, higher current density is set on the rear surface side (FIG. 7).

(2) Intermediate Layer (Ag)

Silver cyanide of 30 to 60 g/L, sodium cyanide of 100 to 200 g/L, and sodium carbonate of 10 to 30 g/L are used. Current density is set at 1.5 to 3 $A/dm^2$.

(3) Cover Layer (Bi)

Bismuth oxide of 10 to 70 g/L, methanesulfonic acid of 30 to 150 mL/L, HS-220S of 20 to 60 mL/L are used. Current density is set at 1 to 6 $A/dm^2$.

Figure 8:
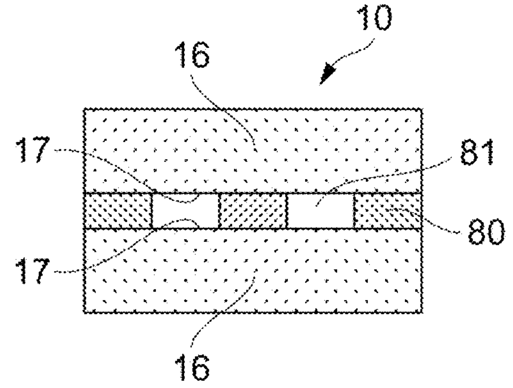
FIG. 8 is a view illustrating a mounting state of the metal member 10 during the Zn treatment.

The plating treatment is carried out by mounting a spacer 80 arranged so that a space 81 is formed between the metal members 10 as illustrated in FIG. 8. A coat can also be formed on the axial end face 17 of the metal member 10 by conducting the plating treatment with the space 81 being present.

By way of example, the relationship between the contact ratio of the metal member and the spacer, and the ratio of a surface area of an adhesive layer covering an axial end face can be set by the following equation:

$$y = -x + 100(\pm 10\%)$$

where y (%) is a value of the ratio of a surface area of an adhesive layer covering an axial end face to a surface area of the axial end face, and x (%) is a value of the contact ratio of the metal member and the spacer.

However, there is the possibility that even a portion contacting the spacer is also coated due to misalignment, deterioration, or the like of the spacer. In that case, coating can be prevented by covering with a tape or the like.

Further, in order to obtain desired surface areas of the adhesive layer and the intermediate layer covering the axial end face, the contact ratio of the metal member and the spacer can be set in a similar manner to the above equation. In that case, y (%) is a value of the ratio of surface areas of the adhesive layer and the intermediate layer covering the axial end face to a surface area of the axial end face, and x (%) is a value of the contact ratio of the metal member and the spacer.

However, the above ratios are an example, and the above manufacturing method and equation are not limited for obtaining the ratio of surface areas of an adhesive layer and/or intermediate layer and a cover layer according to the present invention.

(Validation Test)

For assessment of bearing performance, sliding members according to Examples 1 to 10 of the present invention were prepared to conduct a fatigue test. Test conditions and results are described below.

Figure 9:
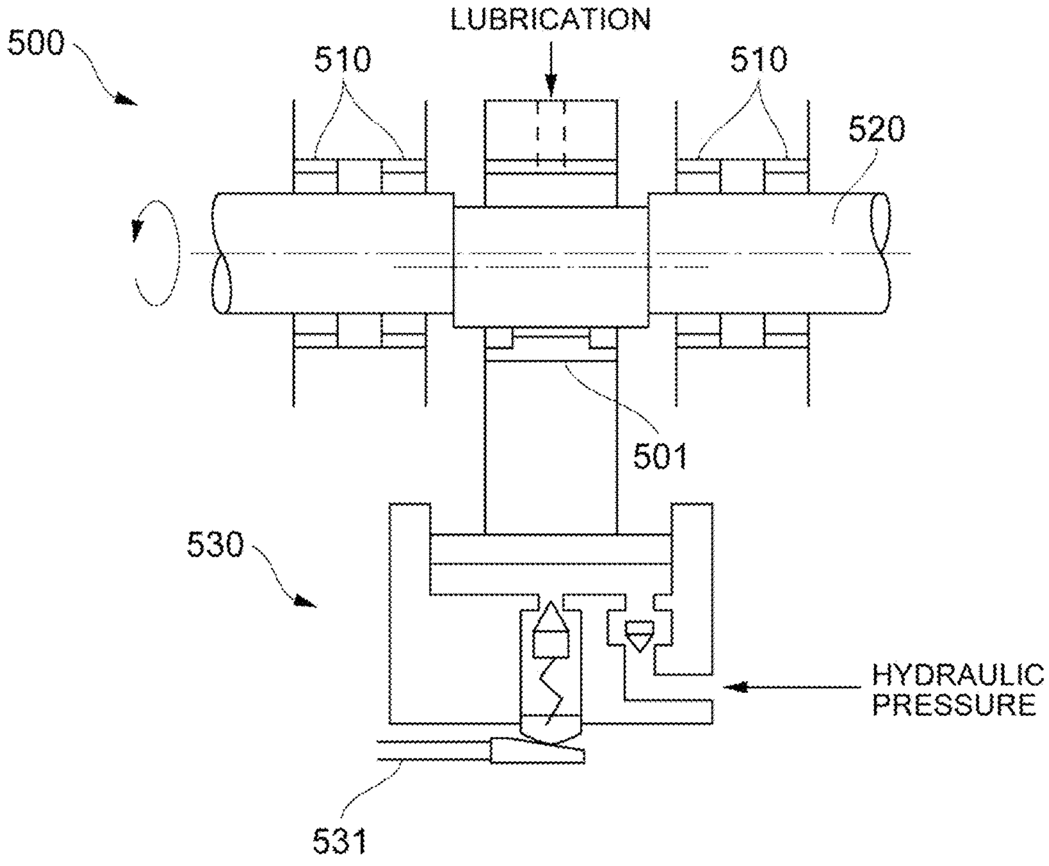
FIG. 9 is a schematic view of a fatigue tester for bearings.

The fatigue test was conducted by using a tester 500 illustrated in FIG. 9. In the tester 500, a test bearing 501 was attached to a support shaft 520 supported by a plurality of support bearings 510, and fatigue was caused in a Bi, Pb coat of a sliding surface by using a load device 530 to apply a load to the test bearing 501 by a hydraulic pressure while rotating the support shaft 520. Fatigue test conditions are as shown in Table 1.

TABLE 1

| Item | Condition |
|---|---|
| Bearing dimensions | OD56 × L14 × T1.5 |
| Rotation speed | 3250 rpm |
| Specific load | 120 MPa |
| Lubricating oil | VG68 |
| Lubrication temperature | 100° C. |
| Shaft material | S55C quenching |
| Shaft roughness | Ra0.06 target |
| Test time | 20 h |

Figure 10:
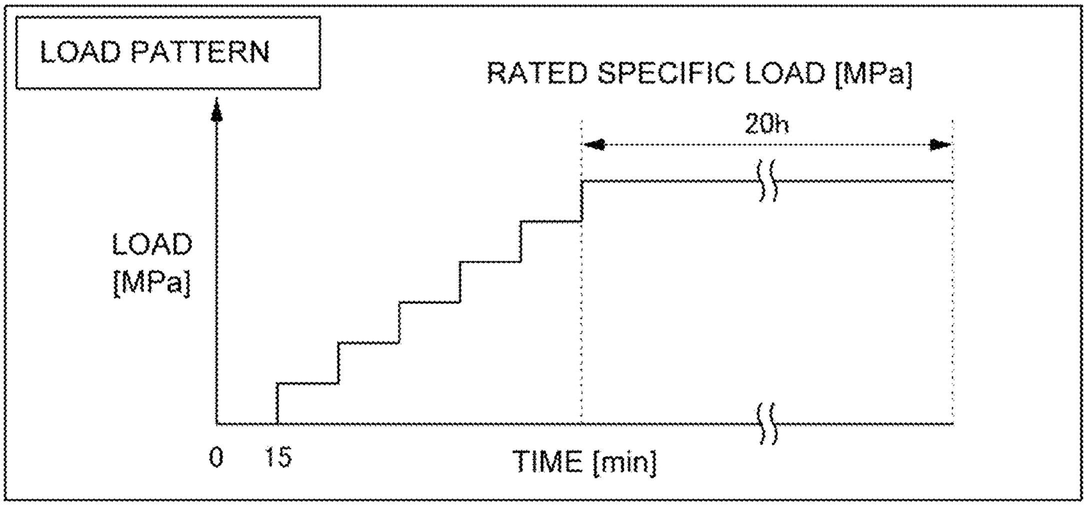
FIG. 10 is a view illustrating a load pattern for a bearing in a fatigue test.

In relation to the specific load shown in Table 1, the test bearing 501 was loaded by a load pattern illustrated in FIG. 10. Specifically, the load was adjusted in phases to 120 MPa which is a rated specific load, by using a pressure regulating valve 531 of the load device 530.

Figure 11:
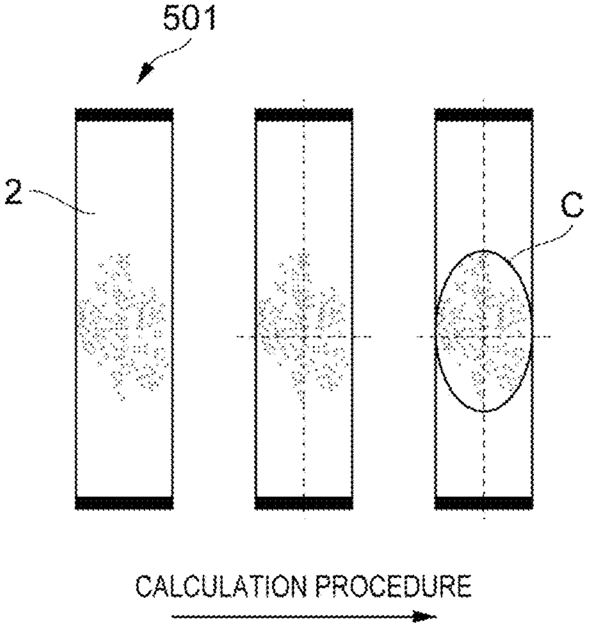
FIG. 11 is a view illustrating a calculation procedure of a fatigue area ratio in a test bearing 501.

The assessment of fatigue resistance was made by externally and visually checking the presence and absence of peeling or fatigue after the test. Specifically, as illustrated in FIG. 11, a fatigue area was measured by approximating, with an ellipse C, a fatigue portion generated in the sliding surface 2 of the test bearing 501. Then, a fatigue area ratio was calculated by calculating the ratio between a projection area of the sliding surface 2 and an area of the approximation ellipse C so that the assessment was made.

Compositions and dimensional conditions of sliding members according to Examples 1 to 10 and Comparative Examples 1 to 4, and test results (the ratio between a projection area and a fatigue area) are shown in Table 2. Note that, in the table, "Area ratio (%) of adhesive layer/axial end face" represents the area ratio of an adhesive layer formed in an axial end face of a metal member to a total surface area of the axial end face, "Area ratio (%) of adhesive layer/outer circumferential surface" likewise represents the area ratio of an adhesive layer formed in an outer circumferential surface of a metal member to a total surface area of the outer circumferential surface, "Area ratio (%) of (cover layer+intermediate layer)/axial end face" represents the area ratio of an overlap portion of a cover layer and an intermediate layer formed in an axial end face of a metal member to a total surface area of the axial end face, "Area ratio (%) of "outer circumferential surface cover layer+outer circumferential surface intermediate layer)/axial end face" represents the area ratio of an overlap portion of a cover layer and an intermediate layer formed in an outer circumferential surface of a metal member to a total surface area of the outer circumferential surface of the metal member, and "Area ratio (%) of fatigue area/projection" represents the ratio between a projection area of the sliding surface 2 and an area of the approximation ellipse C by the external check described above.

From the test results, it can be understood that the fatigue area ratio decreases compared to the comparative examples when a coverage of an adhesive layer in an axial end face is more than 30%, and that the fatigue area ratio more decreases when an adhesive layer extends up to an outer circumferential surface. Moreover, the fatigue area ratio more decreases when there are more intermediate lavers and cover lavers formed on an adhesive laver.

TABLE 2

Fatigue Test (N = 3) results (1)

| | Inner circumferential surface cover layer (5 μm) | Inner circumferential surface intermediate layer (5 μm) | Area ratio (%) of adhesive layer/axial end face | Area ratio (%) of adhesive layer/outer circumferential surface | Area ratio (%) of (cover layer + intermediate layer)/axial end face | Area ratio (%) of (outer circumferential surface cover layer + outer circumferential surface intermediate layer)/outer circumferential surface | Area ratio (%) of fatigue area/projection area |
|---|---|---|---|---|---|---|---|
| Example 1 | Bi | Ag | 30 | 0 | 0 | 0 | 0.51 |
| Example 2 | Pb—In—Sn | Ni | 31 | 12 | 0 | 0 | 0.48 |
| Example 3 | Pb—In—Sn | Ni | 56 | 21 | 0 | 0 | 0.46 |
| Example 4 | Sn—Cu | Ni | 70 | 22 | 0 | 0 | 0.39 |
| Example 5 | Bi | Co | 70 | 30 | 25 | 0 | 0.37 |
| Example 6 | Bi | Ag | 71 | 30 | 30 | 0 | 0.36 |
| Example 7 | Bi | Ag | 71 | 34 | 61 | 0 | 0.35 |
| Example 8 | Bi—Sb | Ag | 75 | 36 | 70 | 26 | 0.30 |
| Example 9 | Bi—Sb | Ag | 76 | 39 | 71 | 30 | 0.28 |
| Example 10 | Bi—Sb | Ag | 96 | 65 | 82 | 59 | 0.24 |
| Comparative Example 1 | Bi—Sb | Ag | 10 | 0 | 0 | 0 | 0.67 |
| Comparative Example 2 | Bi | Co | 0 | 0 | 0 | 0 | 0.83 |

TABLE 2-continued

Fatigue Test (N = 3) results (1)

| | Inner circumferential surface cover layer (5 μm) | Inner circumferential surface intermediate layer (5 μm) | Area ratio (%) of adhesive layer/axial end face | Area ratio (%) of adhesive layer/outer circumferential surface | Area ratio (%) of (cover layer + intermediate layer)/axial end face | Area ratio (%) of (outer circumferential surface cover layer + outer circumferential surface intermediate layer)/outer circumferential surface | Area ratio (%) of fatigue area/projection area |
|---|---|---|---|---|---|---|---|
| Comparative Example 3 | Sn—Cu | Ni | 0 | 0 | 0 | 0 | 0.86 |
| Comparative Example 4 | Pb—In—Sn | Ni | 0 | 0 | 0 | 0 | 0.88 |

Figure 12:
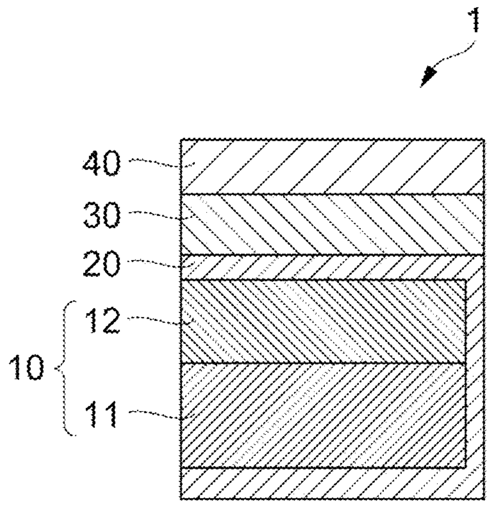
FIG. 12 is a schematic view illustrating a part of a section of a sliding member 1 according to another example of the present invention along a plane including an axis.
Figure 13:
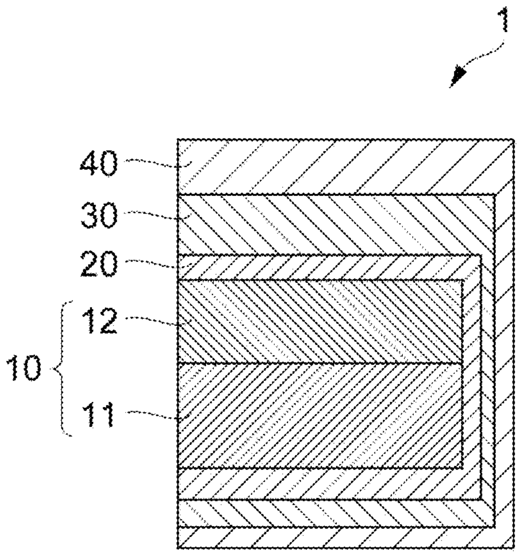
FIG. 13 is a schematic view illustrating a part of a section of a sliding member 1 according to still another example of the present invention along a plane including an axis.

Note that, according to the present invention, the sliding member may have various embodiments. For example, as illustrated in FIG. 12, the adhesive layer 20 may be formed in the sliding member 1 over the inner circumferential surface, axial end face, and outer circumferential surface of the metal member, in which case the intermediate layer 30 and the cover layer 40 may be stacked only on the inner circumferential surface of the metal member 10. Alternatively, as illustrated in FIG. 13, the adhesive layer 20 may be formed over the inner circumferential surface, axial end face, and outer circumferential surface of the metal member 10, and the intermediate layer 30 and the cover layer 40 may be stacked on the adhesive layer 20.

Figure 14:
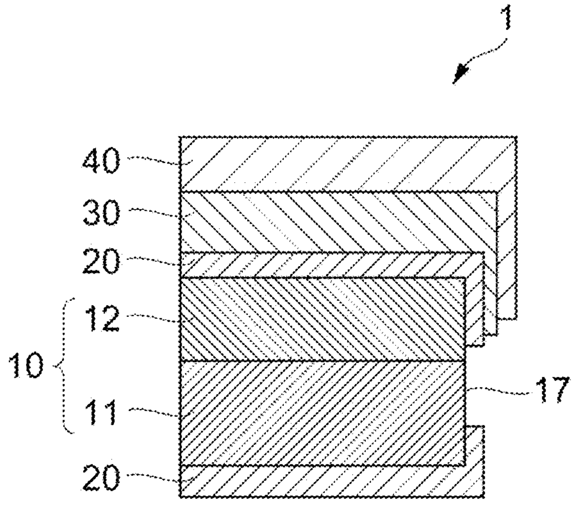
FIG. 14 is a schematic view illustrating a part of a section of a sliding member 1 according to still another example of the present invention along a plane including an axis.
Figure 15:
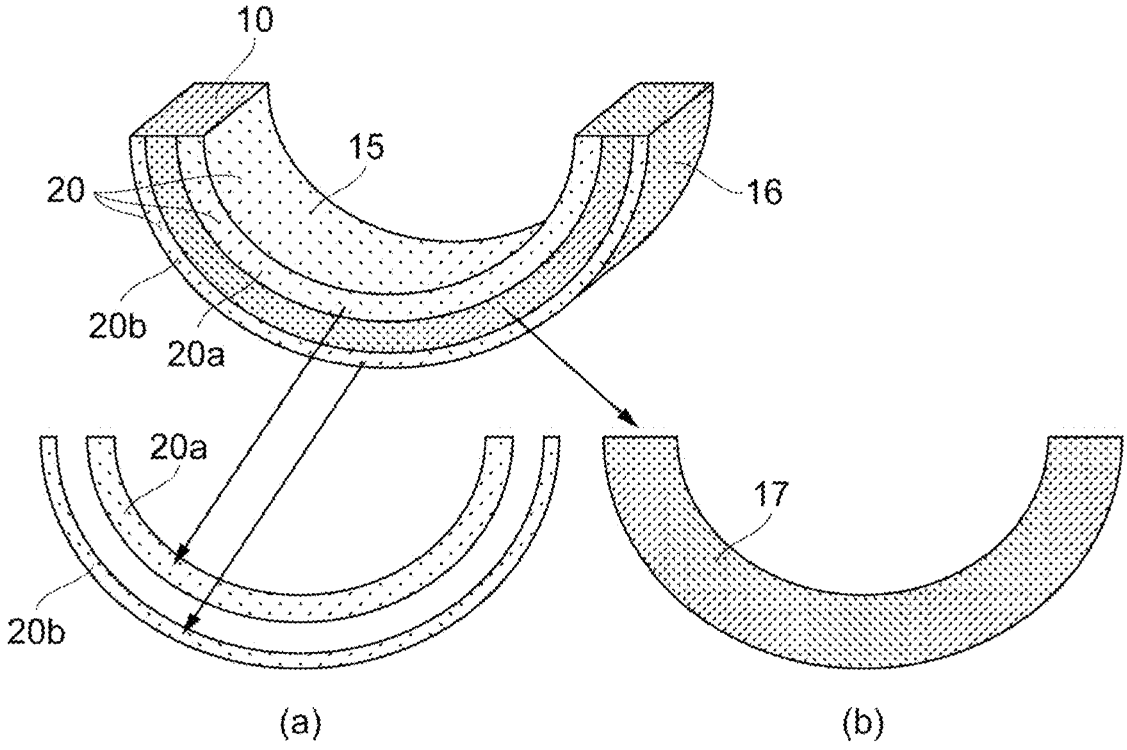
FIG. 15 is a view illustrating a metal member 10 according to still another example of the present invention, on which only an adhesive layer 20 is stacked.

According to the present invention, the adhesive layer 20 only has to be 30% or more in terms of the area accounting for the axial end face 17 of the metal member 10, and does not necessarily need to cover the entire axial end face 17. As illustrated in FIGS. 14 and 15, in a circumferential end face 17 of the metal member 10, the adhesive layer 20 may have the portion 20*a* extending continuously from the inner circumferential surface 15 side of the metal member 10 to the axial end face 17 side, and a portion 20*b* formed on the outer circumferential surface 16 side of the metal member 10. In this case, the sum of surface areas of the portions 20*a* and 20*b* illustrated in FIG. 15(*a*) is preferably 70% or more relative to the surface area of the axial end face 17 illustrated in FIG. 15(*b*).

Figure 16:
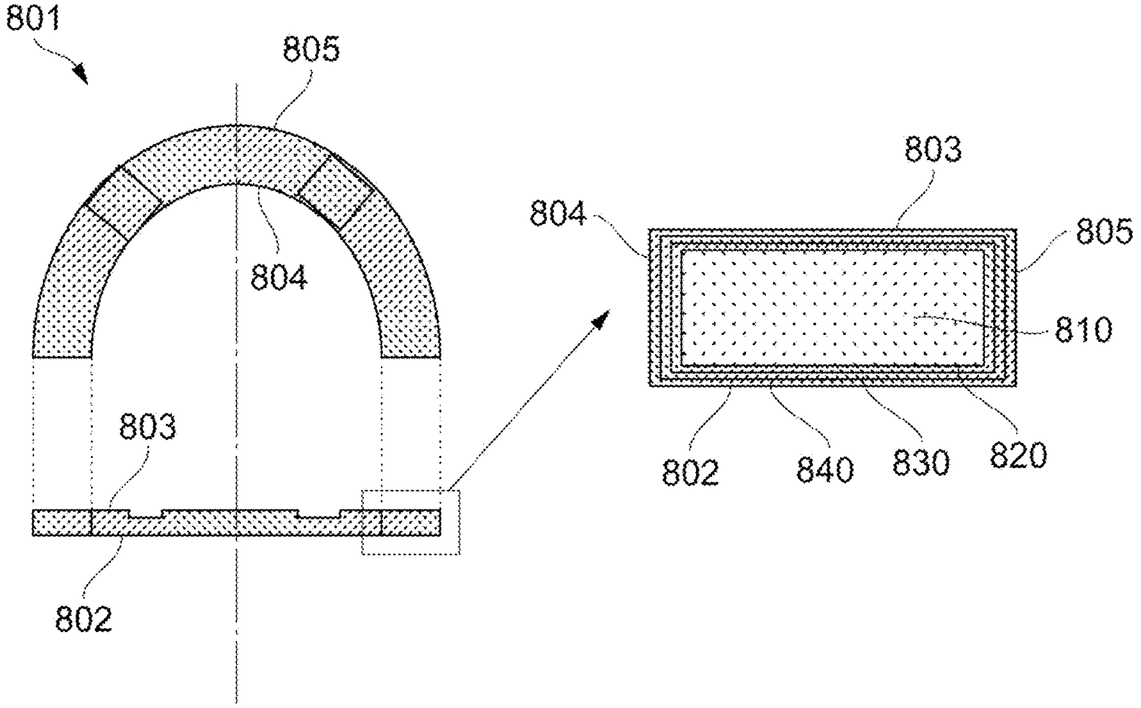
FIG. 16 is a view illustrating a half thrust bearing 801 according to an example in another aspect of the present invention.

In another aspect of the present invention, the sliding member according to the present invention may be formed as a half thrust bearing (thrust washer) 801 as illustrated in FIG. 16. In this case, a sliding surface 802 of the half-thrust bearing 801 corresponds to the inner circumferential surface 2 of the half bearing 1, a surface 803 of the half thrust bearing 801 opposite to the sliding surface 802 corresponds to the outer circumferential surface 3 of the half bearing 1, and an inner circumferential surface 804 and an outer circumferential surface 805 of the half thrust bearing 801 correspond to the axial end face of the half bearing 1.

While the embodiment and examples according to the present invention have been described in detail above with reference to the drawings in connection with performance assessment tests, concrete configurations are not limited thereto, and modifications which do not depart from the spirit of the present invention described in the claims fall within the present invention.

The invention claimed is:

1. A sliding member comprising:
- a semi-annular metal member comprising a back metal layer arranged on an outer circumferential surface side and a lining layer made of an Al alloy and arranged on an inner circumferential surface side;
- an adhesive layer stacked on an inner circumferential surface of the metal member and consisting of Zn and inevitable impurities;
- an intermediate layer stacked on the adhesive layer and consisting of Ag, Ni, or Co, and inevitable impurities; and
- a cover layer stacked on the intermediate layer and consisting of one or more selected from a group of Bi, Pb, Sn, In, Cu and Sb, and inevitable impurities, wherein
- the adhesive layer on the inner circumferential surface of the metal member extends continuously so as to further cover an axial end face of the metal member, and the ratio of a surface area of the adhesive layer covering the axial end face to a surface area of the axial end face is 30% or more.

2. The sliding member according to claim 1, wherein the ratio of the surface area of the adhesive layer covering the axial end face to the surface area of the axial end face of the metal member is 70% or more.

3. The sliding member according to claim 1, wherein the adhesive layer covering the axial end face extends continuously so as to further cover an outer circumferential surface of the metal member, and the ratio of a surface area of the adhesive layer covering the outer circumferential surface of the metal member to a surface area of the outer circumferential surface is 30% or more.

4. The sliding member according to claim 1, wherein the intermediate layer and the cover layer are stacked also on the adhesive layer covering the axial end face of the metal member, and the ratio of surface areas of the intermediate layer and the cover layer stacked on the adhesive layer covering the axial end face of the metal member to the surface area of the axial end face is 30% or more.

5. The sliding member according to claim 4, wherein the ratio of the surface areas of the intermediate layer and the cover layer stacked on the adhesive layer covering the axial end face of the metal member to the surface area of the axial end face is 70% or more.

6. The sliding member according to claim 4, wherein the intermediate layer and the cover layer are stacked also on the adhesive layer covering the outer circumferential surface of the metal member, and the ratio of surface areas of the intermediate layer and the cover layer stacked on the adhesive layer covering the outer circumferential surface of the metal member to a surface area of the outer circumferential surface is 30% or more.

7. The sliding member according to claim 1, wherein the sum of thicknesses of the intermediate layer and the cover layer stacked on the adhesive layer covering the axial end face of the metal member is equal to or less than the sum of thicknesses of the intermediate layer and the cover layer stacked on the adhesive layer covering the inner circumferential surface of the metal member.

8. A sliding member comprising:

a semi-annular metal member comprising a back metal layer arranged on a first axial end face side and a lining layer made of an Al alloy and arranged on a second axial end face side;

an adhesive layer stacked on a second axial end face of the metal member and consisting of Zn and inevitable impurities;

an intermediate layer stacked on the adhesive layer and consisting of Ag, Ni, or Co, and inevitable impurities; and a cover layer stacked on the intermediate layer and consisting of Bi, Pb, Sn, In, Cu and Sb, and inevitable impurities, wherein the adhesive layer on the second axial end face of the metal member extends continuously so as to further cover an inner circumferential surface and an outer circumferential surface of the metal member, and the ratio of a surface area of the adhesive layer covering the inner circumferential surface and the outer circumferential surface to surface areas of the inner circumferential surface and the outer circumferential surface is 30% or more.

* * * * *